Aug. 27, 1940.　　　　G. P. DORRIS　　　　2,212,636
VEHICLE CHASSIS
Filed Aug. 3, 1938
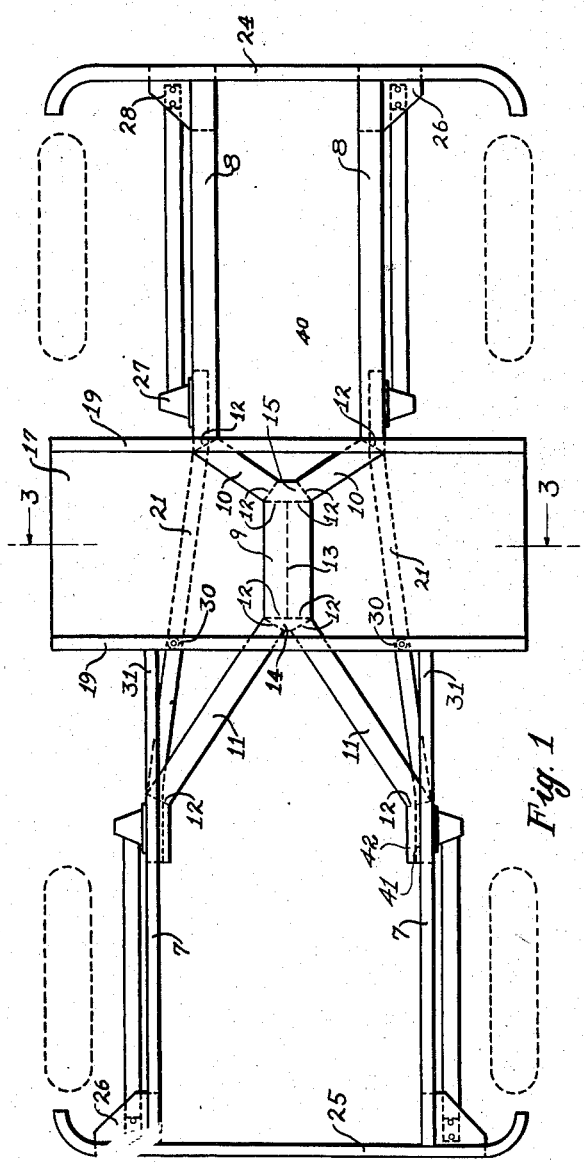
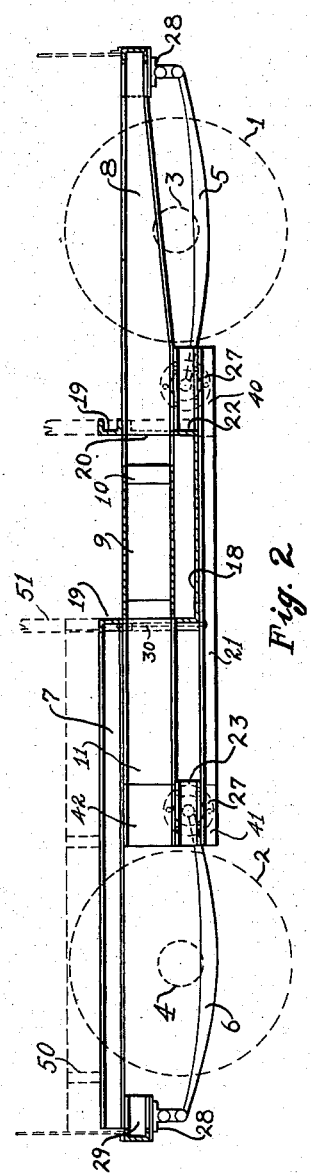
INVENTOR:
George P. Dorris
By Brunings & Sutherland.
Attorneys.

Patented Aug. 27, 1940

2,212,636

UNITED STATES PATENT OFFICE 2,212,636

VEHICLE CHASSIS

George P. Dorris, St. Louis, Mo.

Application August 3, 1938, Serial No. 222,748

8 Claims. (Cl. 280—106)

This invention pertains to a chassis for vehicles. More particularly it is intended for use with automobile delivery wagons, specifically milk wagons.

Many modern milk delivery trucks are arranged with a low floor at the middle portion of the body close enough to the ground so that the driver may easily step in and out of the vehicle. This arrangement is a great saving of labor for the driver who must step in and out of the vehicle for every delivery. It has been found somewhat difficult to provide a chassis for a vehicle of this type, which is sufficiently rigid and particularly which is capable of resisting tortional forces.

One of the objects of this invention, therefore, is to provide a chassis for such a drop-floor vehicle which will be strong and rigid, particularly against tortional forces.

Another object is to provide such a chassis structure which is simple in design and which may be manufactured at low cost.

Another object is to provide such a structure which not only provides a low floor for the driver but provides ample space and strength for carrying a suitable platform to support the load to be transported.

Further objects will appear from the following description taken in connection with the accompanying drawing in which—

Figure 1 is a plan view of a chassis embodying this invention.

Figure 2 is a central longitudinal section of Figure 1, and

Figure 3 is a transverse section on line 3—3 of Figure 1.

Referring to the accompanying drawing, 1 designates the front wheel, and 2 the rear wheel of the vehicle, while 3 designates the front axle, and 4 the rear axle.

The front and rear springs are indicated at 5 and 6, respectively.

Extending above the rear axle 4 are longitudinal side members 7.

Similar forward longitudinal side members 8 extend over the front axle 3. Connecting the members 7 and 8 in the middle portion of the chassis is an intermediate frame comprising a central longitudinal portion 9, outwardly extending arms 10 at the forward portion thereof and rearwardly extending legs 11, forming together a sort of X-frame. The arms 10 are rigidly connected to the forward members 8 while the legs 11 are similarly connected to the rear longitudinal members 7. The members 8 extend in prolongation of the X-frame portion while the members 7 are placed above the X-frame, which may be welded, or otherwise rigidly secured thereto.

The X-frame portion of the chassis may be constructed in any suitable manner. By one method it may be built up of angle or channel bars suitably bent to shape and welded together. For instance, as shown by dotted lines in Figure 1, the upper portion of this X-frame may be constructed of a suitable channel placed with its web vertical and having its flanges cut, as indicated at 12, and the channel bent to the form shown. In this construction the forward members 8 are formed of the same channel as the X-frame portion. The two side parts may then be connected together at the middle by welding along the line 13, suitable filler plates being welded in at 14 and 15. Another way of constructing this part might be to divide it by a horizontal plane through its middle and forming the upper and lower sections by pressing. These two sections may then be welded together to form the complete frame. It will be noted that by this construction the central portion 9 takes a box form, as clearly shown in Figure 3. This provides a convenient construction as it furnishes a tunnel through which the propellor shaft indicated at 16 may pass from the motor on the front part of the chassis to the rear axle.

Extending transversely across the middle portion of the chassis is a drop-floor section indicated generally at 17. This may be formed by a channel 18 laid horizontally with its flanges extending upwardly. The web of this channel provides the floor of the vehicle upon which the operator stands. Extending transversely over the top of the X-frame and parallel to the edges of the channel 18 are angle or channel bars 19. The channels 19 may be joined with the upstanding flanges 20 of the channel 18 at the sides of the X-frame portion by welding or otherwise. The rear channel 19 may be similarly connected to the channel 18 at the sides of the X-frame.

Extending longitudinally of the chassis laterally below the X-frame portion are tension members 21. These may be in the form of angle or channel bars or of any other suitable structural shape. They are rigidly connected at their ends to the members 7 and 8, respectively, where they join the intermediate frame portion. To make these connections in the embodiment illustrated, the members 21 may have forwardly bent portions 40 and rearwardly bent portions 41 attached to the X-frame through spacers. Similarly, the legs 11 may have rearwardly bent portions 42 attached to the members 7. All of these connections are preferably made welding, although other methods of attachment may be used. As the members 21 extend below the channel 18, suitable spacers 22 and 23 are secured to the under side of the members 8 and 7, respectively, and the members 21 are then secured to the spacers. By this construction the tension members 21 are spaced vertically below the X-frame portion and the members 7 and 8. Cross-frame members 24 and 25 are suitably secured to the outer ends of the members 8 and 7, respectively, so as to form the ends of the chassis. These members may be suitably formed to serve also as bumpers and may be braced to the frame by gusset plates 26. Connections of all these parts to each other are preferably made by welding or other sufficiently rigid manner of fastening.

The springs 5 and 6 may be mounted on suitable brackets 27 and 28, the rear bracket 28 being properly positioned by a suitable spacer 29.

At an intermediate point of the X-frame upwardly extending posts or braces 30 may be provided, connecting the lower tension members 21 with the rear cross-channel 19, and the members 7 may be extended forwardly, as indicated at 31, and connected to the same cross-member 19. This provides additional bracing to stiffen this portion of the frame particularly against twisting.

A load-supporting floor may be laid upon sills 50 extending transversely across the members 7, and a body of any suitable design may be supported upon the cross members 19, 24 and 25 as indicated in dotted lines in Figure 2. Door frame members 51 may be secured to the ends of the channels 19 and to the floor member 18, thereby providing a strong bracing for the door frame.

It will be seen that this invention accomplishes its objects by providing a chassis structure which is very rigid particularly against tortional forces. It has been found that a milk truck built on a chassis of this structure may be supported at one end by a jack placed at the corner of the frame and both wheels on that end to be lifted from the ground showing that the structure is extremely rigid to withstand twisting. The vertical strength of the structure is also great on account of the fact that the X-frame provides a strong compression member while the members 21 provide tension members spaced below the compression member so that a sort of truss is provided to take the bending load applied to the chassis between the axles. This truss is further stiffened against such bending by the braces 30 and against tortional forces by the same structure assisted by the forward extensions 31 of the rear side members 7. The box portion 9 of the X-frame provides a convenient passage for the propeller shaft and at the same time protects the latter. While this portion extends through the drop-floor section, it is relatively narrow and occupies only a small part of the middle of the section. It is low enough so that the operator may step over it in passing from side to side of the vehicle. The cross members 19 provide strong supports for the various body portions including any door frames or similar members which it may be desired to employ. The end members 24 and 25, in addition to providing frame members and bumpers, may also be used as supports for the body. The forward longitudinal members 8 provide convenient means for supporting a motor.

While the above has been described as a unitary structure, it will be understood that individual features or sub-combinations thereof may be valuable by themselves without reference to other features or the complete combination, and that the employment of such individual features or sub-combinations is contemplated by this invention and within the scope of the appended claims.

It is further obvious that various changes may be made in the details of construction within the scope of the appended claims without departing from the spirit of this invention, and it is understood that the invention is not limited to the specific details shown or described.

Having thus described the invention, what is claimed is as follows:

1. A vehicle chassis, comprising, a central main frame portion having forwardly and rearwardly diverging members, and longitudinally extending bracing means in a plane spaced therebelow rigidly connected to said main frame portion to form therewith a trussed frame braced against a vertical load.

2. A vehicle chassis, comprising, an X-frame, and longitudinally extending tension means connected to the end portions of said frame and spaced vertically below the X-portion thereof to form therewith a structure braced against a vertical load, said tension means forming a floor support.

3. A chassis for a vehicle having front and rear axles, comprising, longitudinal rear side members extending above the rear axle, forward longitudinal side members above the front axle, a drop floor section extending transversely of the chassis between said forward and rear members below the level of the axles, and an X-frame rigidly joining said forward and rear members and traversing said floor section.

4. A chassis for a vehicle having front and rear axles, comprising, longitudinal rear side members extending above the rear axle, forward longitudinal side members above the front axle, a drop floor section extending transversely of the chassis between said forward and rear members below the level of the axles, an X-frame rigidly joining said forward and rear members and traversing said floor section, and tension means connecting said forward and rear members and extending below said floor section.

5. A vehicle chassis, comprising, a horizontal X-frame, rear longitudinal members above said frame and connected thereto, forward longitudinal members connected to said frame, a drop-floor section extending transversely of said frame, and tension means extending longitudinally below said X-frame and connected to its ends.

6. A vehicle chassis, comprising, a horizontal X-frame, rear longitudinal members above said frame and connected thereto, forward longitudinal members connected to said frame, a drop-floor section extending transversely of and depressed with respect to said frame, and side bars extending below said section and connected to the ends of said frame.

7. A vehicle chassis, comprising, a horizontal X-frame, rear longitudinal members above said frame and connected thereto, forward longitudinal members connected to said frame, a drop-floor section extending transversely of said frame, and side bars extending below said section and connected to the ends of said frame, said X-frame having a central box section providing passage for a shaft, 8. In a vehicle chassis of the character described, a frame structure, comprising, separate forward and rear frame portions, a drop floor section extending transversely of the chassis between said forward and rear frame portions, an intermediate frame portion extending fore-and-aft of the chassis across the middle portion of said drop floor section and connected to said forward and rear frame portions, and bracing means extending longitudinally below said intermediate frame portion and connected to adjacent end portions of the frame structure to form therewith a trussed frame braced against a vertical load.

GEORGE P. DORRIS.